Oct. 8, 1940.  H. B. KLUSMEYER  2,217,555
COOKING VESSEL
Filed March 22, 1939
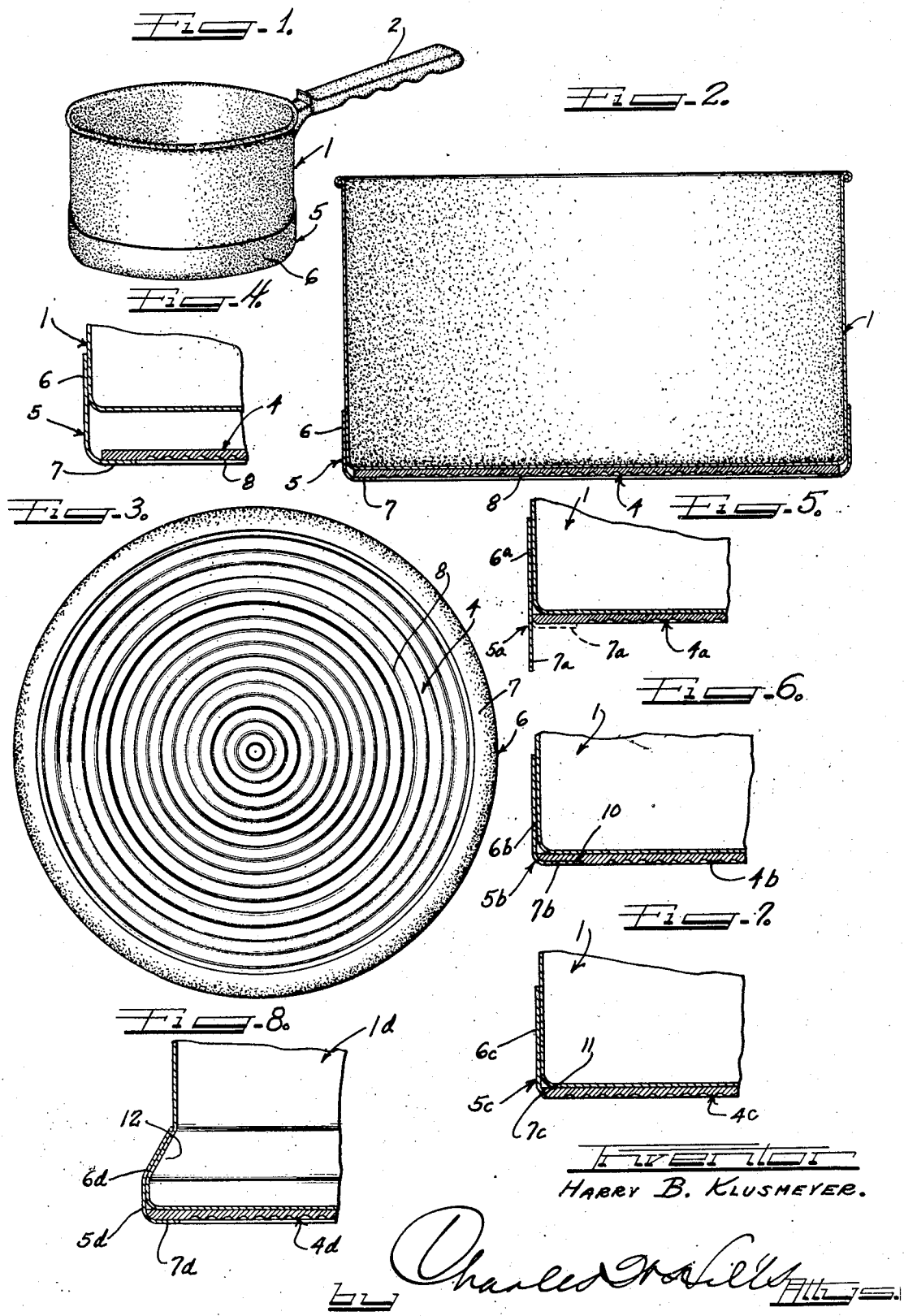

Patented Oct. 8, 1940

2,217,555

UNITED STATES PATENT OFFICE 2,217,555

COOKING VESSEL

Harry B. Klusmeyer, Chicago, Ill.

Application March 22, 1939, Serial No. 263,319

3 Claims. (Cl. 53—8)

This invention relates to cooking vessels and more particularly to the bottom structure of a cooking vessel or pot.

An object of this invention is to provide a cooking vessel or pot with an improved bottom structure which will augment the longevity of the vessel, and which will also provide for proper heat distribution.

Another object of this invention is to provide an improved structure for securing a heat distribution plate to the bottom of a pot.

A further object of the invention relates to the provision of novel structure for connecting a heat distributing plate made of one material, such as copper or brass, with the bottom of a pot made of a different material, such, for example, as steel or stainless steel, in such a manner that the difference in the linear coefficient expansion of the two materials may be accommodated.

In accordance with the general features of this invention, there is provided a cooking vessel comprising a pot having disposed below its bottom a heat distributing metallic plate of substantially the same diameter as that of the bottom of the pot and fastened to the pot bottom by a metallic annulus which includes an upstanding flange welded to the side of the pot and an inwardly extending flange underneath the plate and overlapping the peripheral margin of the plate so as to retain the plate on the bottom of the pot; these flanges being at substantially a right angle to each other.

In accordance with other features of this invention, the horizontal or inwardly extending flange of the previously mentioned annulus is so inter-engaged with the heat distributing plate as to not require the use of any rivets or the like to secure the distributing plate to the bottom of the pot.

A still further feature of the invention relates to the provision of means in the heat distributing plate at the bottom of the pot for accommodating and adjusting for the different linear coefficient of expansion of the plate from that of the material of the pot.

Further features of the invention relate to a number of different ways of attaching the metallic holding annulus to the heat distributing plate, all of which, however, do not require the use of any holes or rivets in the distributing plate or in the pot.

Other objects and features of this invention will more fully appear from the following detailed description taken in connection with the accompanying drawing, which illustrates a number of embodiments thereof, and in which:

Figure 1 is a perspective view of a pot embodying the features of this invention;

Figure 2 is a vertical cross sectional view taken through the pot shown in Figure 1, and drawn to an enlarged scale;

Figure 3 is a bottom view of the pot shown in Figure 2;

Figure 4 is a fragmentary sectional view illustrating one way of attaching the distributing plate and holding annulus to the bottom of the pot;

Figure 5 is a sectional view similar to Figure 4 illustrating another way of attaching the parts at the bottom of the pot;

Figure 6 is a sectional view similar to Figures 4 and 5 showing a still further way of attaching the parts at the bottom of the pot;

Figure 7 is a sectional view similar to Figure 4 showing a slightly modified form of heat distributing plate; and Figure 8 is a sectional view similar to Figure 4 showing a pot having a bulged bottom and showing how my invention may be applied thereto.

As shown on the drawing:

The reference character 1 designates generally a metallic pot which may be made of any suitable material, such, for example, as stainless steel, and which is provided with any suitable handle, such, for example, as the handle 2. It is, of course, to be understood that any conventional type of handle or bail may be used with the top structure of my invention.

The reference character 4 designates generally a heat distributing plate applied over and contiguous with the bottom side of the pot, which plate is made of a metallic material different from that of the pot, such, for example, as copper or brass. This plate 4 is held in place contiguous with the bottom surface of the pot by a metallic annulus designated generally by the reference numeral 5, and which is preferably made of a material corresponding to that of the pot proper. In other words, if the pot is made of stainless steel, this metallic annulus is similarly made of the same material so that it may be readily welded to the side of the pot. By stainless steel, I mean a material having predetermined proportions of chromium and nickel, such, for example, as the so-called "18—8 Chrome Nickel Steel."

The metallic annulus 5 is of right angular cross section and includes a horizontal flange 7 and a vertical flange 6. The vertical flange 6 is secured to the side of the pot adjacent its bottom as by means of welding or the like. The horizontal flange 7 tightly embraces the peripheral margin of the plate 4 so as to firmly hold this plate against the bottom surface of the pot proper.

Due to the fact that the heat distribution plate 4 is of a metallic material having a different linear coefficient of expansion than that of the metallic material of the pot, I have found it desirable to allow for or accommodate such difference by providing the bottom surface of the plate 4 with a plurality of downwardly projecting ribs or corrugations 8. These ribs are of very slight depth and may be arranged in the form shown in Figure 3, in which it will be perceived that the ribs are shown as concentric circular ribs. These corrugations, I find, are advantageous in that they tend to prevent buckling of the copper plate when in use due to the fact that it does have a different linear coefficient of expansion from that of the steel material of the pot.

It will, of course, be perceived that this plate 4 is desirable, since it greatly enhances the distribution of heat in the bottom of the pot and also increases the life of the pot, since the bottom of the pot structure is necessarily considerably thicker and will not wear out as quickly as if it was only of a single thickness.

In Figures 4 to 8 inclusive, I have illustrated a number of different ways of attaching the annulus and heat distribution plate to the bottom of the pot. The same reference numerals have been employed in these views to designate common parts.

In Figure 4, the annulus 5 preferably comprises a stamping punched from sheet stock and made in the form of what might be termed a pie plate. After the annulus 5 has been blanked, a heat distribution plate 4 is disposed therein, and then the pot 1 is pressed downwardly into the annulus by means of suitable press equipment. When the pot is pressed and held with its bottom against the plate 4, the side flange 6 of the annulus may be welded or otherwise secured to the sidewall of the pot.

As shown in Figure 5, the metallic annulus 5a has a vertical portion 6a which is first welded or otherwise secured to the side of the pot. Thereafter, a lower portion 7a of the annulus is pressed upwardly to a horizontal position in tight engagement with the distributing plate 4a. The full lines indicate the position of the portion 7a material prior to the press operation, and the dotted lines indicate the position of the portion after it is pressed into tight retaining engagement with the plate 4a. If it is so desired, this ring 5a may be formed from strip stock having its ends butt welded to hold the strip in circular shape.

In Figure 6, the metallic annulus 5b has a vertical flange 6b welded to the side of the pot 1 and has a horizontal flange 7b set in a recess 10 in the heat distribution plate 4b. In both the forms shown in this figure and that shown in Figure 5, the outer edge of the plate 4a may be slightly beveled or rounded and the horizontal flange of the annulus may be pressed into tight and intimate contact with this rounded edge, as illustrated.

In Figure 7, the metallic annulus 5c has a vertical flange 6c welded to the side of the pot 1 and has an inwardly extending inclined flange 7c tightly embracing the beveled edge 11 on the plate 4c. This flange 7c, however, does not extend under the bottom surface of the plate as in the other form, but is interlocked with the upwardly beveled peripheral edge of the plate as shown.

In Figure 8, I have illustrated a pot 1d having a bulged bottom 12 around which is pressed and secured a metallic annulus 5d. This annulus includes an upwardly extending flange 6d shaped to correspond with the bulged lower portion of the pot and interlocked therewith, as well as being welded thereto. The annulus also includes a horizontal flange 7d extending under and tightly embracing the bottom surface of the heat distribution plate 4d.

It will be perceived that in all forms of the invention the bottom of the pot includes a metallic annulus preferably of the same material as that of the pot and a heat distribution plate held in place contiguous with the bottom surface of the pot by this annulus and without requiring the use of any rivets or other means extending through holes in the plate. The annulus is interlocked with the bottom of the pot by a simple press operation and is welded to the side of the pot so as to hold the plate in place.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. As an article of manufacture, a cooking vessel comprising a pot having disposed below its bottom a heat distributing plate of different material from that of the pot and fastened to the bottom by an annulus of the same material as that of the pot and including an upstanding flange secured to the side of the bottom and an inwardly extending flange overlapping the peripheral margin of said plate, said plate having its bottom surface ribbed to take care of the difference between the linear coefficient of expansion of the material of said pot and that of the material of said plate.

2. As an article of manufacture, a cooking vessel comprising a pot having disposed below its bottom a heat distributing plate of different material from that of the pot and fastened to the bottom by an annulus of the same material as that of the pot and including an upstanding flange secured to the side of the bottom and an inwardly extending flange overlapping the peripheral margin of said plate, said plate having its bottom surface ribbed to take care of the difference between the linear coefficient of expansion of the material of said pot and that of the material of said plate, the ribs on said plate comprising spaced concentric corrugations.

3. As an article of manufacture, a cooking vessel comprising a pot having disposed below its bottom a heat distributing plate of different material from that of the pot and fastened to the bottom by an annulus of the same material as that of the pot and including an upstanding flange secured to the side of the bottom and an inwardly extending flange overlapping the peripheral margin of said plate, said plate having its outer edge beveled and said overlapping flange tightly embracing said beveled edge.

HARRY B. KLUSMEYER.